(12) United States Patent
Lefebvre

(10) Patent No.: US 11,624,319 B2
(45) Date of Patent: Apr. 11, 2023

(54) REVERSE-FLOW GAS TURBINE ENGINE WITH ELECTRIC MOTOR

(71) Applicant: PRATT & WHITNEY CANADA CORP., Longueuil (CA)

(72) Inventor: Guy Lefebvre, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 236 days.

(21) Appl. No.: 16/875,451

(22) Filed: May 15, 2020

(65) Prior Publication Data

US 2021/0355869 A1  Nov. 18, 2021

(51) Int. Cl.
   *F02C 7/36* (2006.01)
   *F02C 6/20* (2006.01)

(52) U.S. Cl.
   CPC .................. *F02C 6/20* (2013.01); *F02C 7/36* (2013.01); *F05D 2220/323* (2013.01); *F05D 2220/70* (2013.01); *F05D 2220/76* (2013.01)

(58) Field of Classification Search
   CPC ............... F02C 7/32; F02C 7/36; F02C 7/275
   See application file for complete search history.

(56) References Cited

U.S. PATENT DOCUMENTS

| | | |
|---|---|---|
| 4,109,743 A | 8/1978 | Brusaglino et al. |
| 4,554,989 A | 11/1985 | Gruich et al. |
| 5,309,029 A * | 5/1994 | Gregory ............. F02C 7/32 290/1 R |
| 5,867,979 A | 2/1999 | Newton et al. |
| 7,770,377 B2 | 8/2010 | Rolt |
| 7,802,757 B2 | 9/2010 | Dooley et al. |
| 7,854,582 B2 | 12/2010 | Ullyott |
| 7,926,287 B2 | 4/2011 | Ullyott et al. |
| 8,226,522 B2 | 7/2012 | Lemmers, Jr. |
| 8,232,700 B2 | 7/2012 | Dooley |
| 8,461,704 B2 | 6/2013 | McLoughlin et al. |
| 9,601,970 B2 | 3/2017 | French et al. |
| 10,371,007 B2 | 8/2019 | Cigal et al. |

(Continued)

FOREIGN PATENT DOCUMENTS

| | | |
|---|---|---|
| EP | 1785614 A2 | 5/2007 |
| EP | 3296541 A1 | 3/2018 |
| EP | 3335995 A1 | 6/2018 |

OTHER PUBLICATIONS

European Search report issued in counterpart EP application No. 21174187.1 dated Oct. 10, 2021.

*Primary Examiner* — Todd E Manahan
*Assistant Examiner* — Thuyhang N Nguyen
(74) *Attorney, Agent, or Firm* — Norton Rose Fulbright Canada LLP

(57) ABSTRACT

A reverse-flow gas turbine engine includes a core of the gas turbine engine comprising multiple spools rotatable about a center axis of the gas turbine engine. Each spool is configured to pressurize air and to extract energy from combustion gases. The air and combustion gases are configured to flow through the core in a forward direction from an air inlet at an aft end of the core to an outlet at a forward end of the core. A propeller is disposed forward of the outlet. A reduction gearbox (RGB) is drivingly engaged to the core. An electric motor is drivingly engaged to the propeller and disposed axially between the RGB and the propeller.

20 Claims, 2 Drawing Sheets

(56) References Cited

U.S. PATENT DOCUMENTS

| | | |
|---|---|---|
| 10,408,133 B2 | 9/2019 | Wintgens et al. |
| 10,458,340 B2 | 10/2019 | Lefebvre |
| 10,465,611 B2 | 11/2019 | Durocher et al. |
| 10,533,559 B2 | 1/2020 | Plante et al. |
| 10,774,741 B2* | 9/2020 | Sennoun ................... F02C 7/00 |
| 11,015,480 B2* | 5/2021 | Waun ..................... F01D 15/10 |
| 11,015,532 B2* | 5/2021 | Kusnierek ............... F01D 19/00 |
| 11,084,595 B2* | 8/2021 | Murrow ................... B64C 3/10 |
| 11,143,113 B2* | 10/2021 | Kopeschka ............... F02C 9/28 |
| 2004/0255590 A1* | 12/2004 | Rago ........................ F02C 7/36 |
| | | 60/793 |
| 2013/0098060 A1 | 4/2013 | Suciu et al. |
| 2015/0315974 A1 | 11/2015 | Suciu et al. |
| 2017/0320584 A1* | 11/2017 | Menheere ............... B64D 27/10 |
| 2017/0370284 A1 | 12/2017 | Harvey et al. |
| 2018/0023482 A1* | 1/2018 | Lefebvre ................... F02C 3/08 |
| | | 415/68 |
| 2018/0073438 A1 | 3/2018 | Durocher et al. |
| 2018/0135522 A1 | 5/2018 | Mitrovic et al. |
| 2018/0080378 A1 | 8/2018 | Forest et al. |
| 2018/0223740 A1 | 8/2018 | Forest et al. |
| 2018/0251226 A1 | 9/2018 | Fenny et al. |
| 2019/0233128 A1 | 8/2019 | Klonowski et al. |
| 2020/0049025 A1 | 2/2020 | Morgan et al. |
| 2021/0078700 A1* | 3/2021 | Klemen ................. B60L 53/20 |
| 2021/0281004 A1* | 9/2021 | Trawick ............... H01R 13/052 |

* cited by examiner

REVERSE-FLOW GAS TURBINE ENGINE WITH ELECTRIC MOTOR

TECHNICAL FIELD

The application relates generally to gas turbine engines and, more particularly, to gas turbine engines with a reverse flow core.

BACKGROUND

Reverse-flow gas turbine engines draw air into a central core of the engine near a rear portion of the engine, and exhaust combustion gases from a front portion of the engine. Gases therefore flow through the core from the rear to the front of the engine.

In some conventional reverse-flow engines, air is drawn into the core and compressed with a compressor stage driven by a first turbine stage. A second turbine stage, separate from the first turbine stage and rotating a separate shaft, provides the rotational output of the engine.

SUMMARY

There is disclosed a reverse-flow gas turbine engine, comprising: a core of the gas turbine engine comprising multiple spools rotatable about a center axis of the gas turbine engine, each spool configured to pressurize air and to extract energy from combustion gases, the air and combustion gases configured to flow through the core in a forward direction from an air inlet at an aft end of the core to an outlet at a forward end of the core; a propeller disposed forward of the outlet; a reduction gearbox (RGB) drivingly engaged to the core; and an electric motor drivingly engaged to the propeller and disposed axially between the RGB and the propeller.

There is disclosed a reverse-flow gas turbine engine, comprising: a propeller; a first spool having a low pressure compressor (LPC) in fluid communication with an air inlet and a low pressure turbine (LPT), the LPC disposed axially between the air inlet and the LPT; a second spool having a high pressure compressor (HPC) in fluid communication with the LPC to receive pressurized air therefrom, and a high pressure turbine (HPT) drivingly engaged to the HPC and in fluid communication with the LPT, the HPC disposed axially between the LPC and the HPT and the HPT disposed axially between the HPC and the LPT; a reduction gearbox (RGB) drivingly engaged to, and disposed axially between, the LPT and the propeller; and an electric motor drivingly engaged to the propeller and disposed axially between the RGB and the propeller.

There is disclosed a method of modifying a reverse-flow gas turbine engine comprising multiple spools drivingly engaged to a reduction gearbox (RGB) and a propeller, the method comprising: mounting an electric motor within the gas turbine engine and positioned axially between the RGB and the propeller, and drivingly engaging the electric motor to the propeller.

There is disclosed a method of operating the gas turbine engine and the propeller. The method includes operating the engine to drive the core and the RGB drivingly coupled thereto. The method includes operating the electric motor positioned axially between the RGB and the propeller 1 to drive, at least partially, the propeller.

DESCRIPTION OF THE DRAWINGS

Reference is now made to the accompanying figures in which.

DETAILED DESCRIPTION

Figure 1:
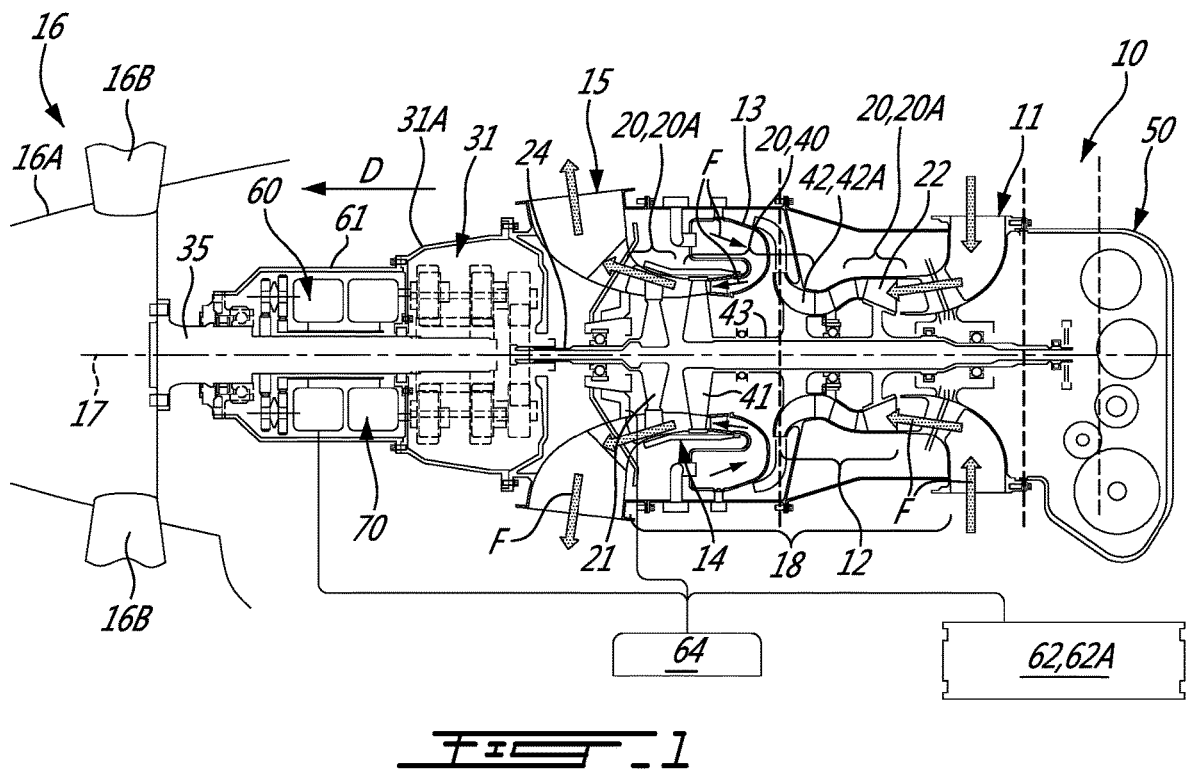
FIG. 1 is a schematic cross-sectional view of a gas turbine engine.

FIG. 1 illustrates a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust outlet 15 through which the combustion gases exit the gas turbine engine 10. The gas turbine engine 10 has a longitudinal center axis 17. The engine 10 in FIG. 1 is a turboprop engine 10 and includes a propeller 16 which provides thrust for flight and taxiing. The propeller 16 includes a nose cone 16A and propeller blades 16B which rotate about the center axis 17 to provide thrust.

The gas turbine engine 10 (sometimes referred to herein simply as "engine 10") has a central core 18 through which gases flow and which includes most of the turbomachinery of the engine 10. The engine 10 is a "reverse-flow" engine 10 because gases flow through the core 18 from the air inlet 11 at a rear or aft portion of the engine 10, to the exhaust outlet 15 at a front portion of the engine 10. This is in contrast to "through-flow" gas turbine engines in which gases flow through the core of the engine from a front portion to a rear portion. The direction of the flow of gases through the core 18 of the engine 10 is shown in FIG. 1 with arrows F. The direction of the flow of gases through the core 18 of the engine 10 can be better appreciated by considering that the gases flow through the core 18 in the same direction D as the one along which the engine 10 travels during flight. Stated differently, gases flow through the engine 10 from a rear end of the core 18 towards a front end adjacent the propeller 16.

It will thus be appreciated that the expressions "forward" and "aft" used herein may refer to the relative disposition of components of the engine 10, in correspondence to the "forward" and "aft" directions of the engine 10 and aircraft including the engine 10 as defined with respect to the direction of travel D. In the embodiment shown, a component of the engine 10 that is "forward" of another component is arranged within the engine 10 such that it is located closer to the propeller 16. Similarly, a component of the engine 10 that is "aft" of another component is arranged within the engine 10 such that it is further away from the propeller 16.

Still referring to FIG. 1, the core 18 of the engine 10 has multiple spools 20. One or more of the spools 20 rotate about the center axis 17 to perform compression to pressurize the air received through the air inlet 11, and to extract energy from the combustion gases before they exit the core 18 via the exhaust outlet 15 a forward end of the core 18. The core 18 may include other components as well, including, but not limited to, gearboxes, tower shafts, and bleed air outlets.

A first spool 20A includes at least one component to compress the air that is part of the compressor section 12, and at least one component to extract energy from the combustion gases that is part of the turbine section 14. More particularly, the first spool 20A has a low pressure turbine 21 which extracts energy from the combustion gases, and a low pressure compressor 22 for pressurizing the air. The low pressure turbine 21 (sometimes referred to herein simply as "LPT 21") in FIG. 1 is separated mechanically from the low pressure compressor 22 (sometimes referred to herein simply as "LPC 22"). Both the LPT 21 and the LPC 22 are disposed along the center axis 17. In the depicted embodiment, both the LPT 21 and the LPC 22 are axial rotatable components having an axis of rotation that is coaxial with the center axis 17. They can each include one or more stages of rotors and stators, depending upon the desired engine thermodynamic cycle, for example.

The LPT 21 is forward of the LPC 22. The LPT 21 is aft of the exhaust outlet 15. The LPC 22 is forward of the air inlet 11 and in fluid communication therewith. The LPC 22 is closer to, or at, an aft end of the core 18. The LPC 22 is disposed between the air inlet 11 and the LPT 21 along a direction parallel to the center axis 17. This arrangement of the LPT 21 and the LPC 22 provides for a reverse-flow engine 10 that has one or more low pressure compressors located at the rear of the engine 10 which are driven by one or more forwardly-positioned turbines. Still referring to FIG. 1, the core 18 includes an output drive shaft 24. The drive shaft 24 extends forwardly from the LPT 21 and is drivingly engaged thereto. In FIG. 1, the drive shaft 24 is coaxial with the center axis 17.

A rotatable load, which in the embodiment shown includes the propeller 16, is mountable to the engine 10, and when mounted, is drivingly engaged (e.g. directly or indirectly connected) to the LPT 21, and is located forward of the LPT 21. In such a configuration, during operation of the engine 10, the LPT 21 drives the rotatable load such that a rotational drive produced by the LPT 21 is transferred to the rotatable load. The rotatable load can therefore be any suitable component, or any combination of suitable components, that is capable of receiving the rotational drive from the LPT 21, as now described.

In the embodiment shown, a reduction gearbox 31 (sometimes referred to herein simply as "RGB 31") is drivingly engaged to the core 18 to be driven by one or more components thereof. In FIG. 1, the RGB 31 is disposed axially between the core 18 and the propeller 16. In FIG. 1, the RGB 31 is disposed axially between the LPT 21 and the propeller 16. In an alternate embodiment, the RGB 31 may be part of the core 18. In FIG. 1, the RGB 31 is mechanically coupled to a front end of the drive shaft 24, which extends between the RGB 31 and the LPT 21. The output shaft 24 of the core 18 is thus drivingly connected to the propeller 16 via the RGB 31. The RGB 31 processes and outputs the rotational drive transferred thereto from the LPT 21 via the drive shaft 24 through known gear reduction techniques. The RGB 31 allows for the propeller 16 to be driven at its optimal rotational speed, which is different from the rotational speed of the LPT 21.

The propeller 16 is mechanically coupled to the output of the RGB 31 via a propeller shaft 35. The propeller shaft 35 allows the rotational drive outputted by the RGB 31 (and the core 18) during operation of the engine 10 to be transferred to the propeller 16 to provide propulsion during flight.

Still referring to FIG. 1, the engine 10 includes a second spool 40 with at least one component to compress the air that is part of the compressor section 12, and at least one component to extract energy from the combustion gases that is part of the turbine section 14. The second spool 40 is also disposed along the center axis 17 and includes a high pressure turbine 41 drivingly engaged (e.g. directly connected) to a high pressure compressor 42 by a high pressure shaft 43. Similarly to the LPT 21 and the LPC 22, the high pressure turbine 41 (sometimes referred to herein simply as "HPT 41") and the high pressure compressor 42 (sometimes referred to herein simply as "HPC 42") can include axial rotary components. They can also each include one or more stages of rotors and stators, depending upon the desired engine thermodynamic cycle, for example. In the depicted embodiment, the HPC 42 includes a centrifugal compressor 42A or impeller which is driven by the HPT 41. During operation of the engine 10, the HPT 41 drives the HPC 42.

The HPT 41 is aft of the LPT 21, and forward of the combustor 13. The HPC 42 is aft of the combustor 13, and forward of the LPC 22. The HPT 41 is forward of the HPC 32. The HPC 42 is disposed axially between the LPC 22 and the HPT 41, and the HPT 41 is disposed axially between the HPC 42 and the LPT 21. The HPT 41 and LPT 21 are in fluid communication, such that the combustion gases from the combustor 13 flow through the HPT 41 and then through the LPT 21. From this arrangement of the HPT 41 and the HPC 42, it can be appreciated that during operation of the engine 10, the LPC 22 feeds pressurized air to the HPC 42. Therefore, the pressurized air flow produced by the LPC 22 is provided to the HPC 42. In FIG. 1, the HPC 42 is mechanically coupled to the LPC 22 such that the HPC 42 (and thus the HPT 41) performs all of the compression work.

In light of the preceding, it can be appreciated that the LPT 21 is the "low pressure" turbine section when compared to the HPT 41, which is sometimes referred to as the "gas generator". The LPT 21 is sometimes referred to as a "power turbine". The turbine rotors of the HPT 41 spin at a higher rotational speed than the turbine rotors of the LPT 21 given the closer proximity of the HPT 41 to the outlet of the combustor 13. The engine 10 shown in FIG. 1 is thus a "two-spool" engine 10.

The HPT 41 and the HPC 42 can have any suitable mechanical arrangement to achieve the above-described functionality. For example, and as shown in FIG. 1, the second spool 40 includes the high pressure shaft 43 extending between the HPC 42 and the HPT 41. The high pressure shaft 43 is coaxial with, and drivingly engaged to, the LPC 22 such that the high pressure shaft 43 drives the LPC 22.

Still referring to the embodiment shown in FIG. 1, the engine 10 also includes an accessory gearbox 50. The accessory gearbox 50 (sometimes referred to herein simply as "AGB 50") receives a rotational output and in turn drives accessories (e.g. fuel pump, starter-generator, oil pump, scavenge pump, etc.) that contribute to the functionality of the engine 10. The AGB 50 can be designed with side-facing accessories, top-facing accessories, or rear-facing accessories depending on the installation needs. The AGB 50 is aft of the air inlet 11. During operation of the engine 10, the high pressure shaft 43 transmits a rotational drive to the AGB 50 which in turn drives the accessories of the AGB 50. In an alternate possible embodiment the engine 10, the engine 10 is free of an AGB 50. The AGB 50 can be arranged relative to the core 18 of the engine 10 differently than as shown in FIG. 1. For example, the AG 50 may be mounted on the side of the engine 10, and forward of the air inlet 11. The circumferential angular position of the AGB 50 may be selected to suit specific installation needs. Other positions and arrangements for the AGB 50 are thus possible.

Still referring to FIG. 1, the engine 10 has an electric motor 60. The electric motor 60 is drivingly engaged to the propeller 16 or to some component thereof to providing a rotational output to the propeller 16 to rotate the propeller blades 16B and generate thrust during any suitable aircraft flight condition. The electric motor 60 is provided with an electrical input such as electrical power and generates a mechanical, rotational output to drive the propeller 16. In FIG. 1, the electric motor 60 is provided only with an electrical input and is not also provided with a mechanical input. The output of the electric motor 60 is coupled, directly or indirectly, only to the propeller 16 and is free of mechanical connection to another component. For example, in FIG. 1, the output of the electric motor 60 is coupled to the propeller shaft 35 of the propeller 16, and the propeller shaft 35 is itself driven by an output of the RGB 31 and coupled thereto.

The electric motor 60 is disposed between the RGB 31 and the propeller 16, when considered in a direction parallel to the center axis 17. The electric motor 60 is thus positioned axially between the RGB 31 and the propeller 16 or its components, to drive the propeller 16. This arrangement of the electric motor 60 may allow for matching the rotational output speed of the electric motor 60 to the rotational speed of the propeller 16 at a given flight condition. Therefore, the electric motor 60 may be designed or selected so that its output speed is the same or similar to the rotating speed of the propeller 16. This is in contrast to the output speed of the drive shaft 24 of the LPT 21 or "power turbine" which is typically used to drive the propeller 16, but which often rotates at a much higher speed than the propeller 16 and thus requires speed reduction via the RGB 31. Positioning the electric motor 60 between the RGB 31 and the propeller 16 also places the electric motor 60 in a colder part of the engine 10, which may contribute to improving the working life of the electric motor 60. Positioning the electric motor 60 between the RGB 31 and the propeller 16 may facilitate servicing or repair of the electric motor 60 because the only component that may need to be removed to access the electric motor 60 is the propeller 16. Positioning the electric motor 60 between the RGB 31 and the propeller 16 may allow the electric motor 60 to be provided as a stand-alone or self-sufficient module which is free of any structural attachment to the casing of the engine 10. The engine 10 disclosed herein is thus a reverse-flow, multi-spool engine with an electric motor 60 built into the engine 10 and disposed in between the RGB 31 and the propeller 16.

The electric motor 60 may have any suitable structure or component to achieve the functionality ascribed to it herein. The electric motor 60 may be selected to be sufficiently powerful to drive the propeller 16 either without using fuel in the engine 10, or with using a reduced amount of fuel by the engine 10 during at least one mode of operation of the engine 10. Electricity for driving electric motor 60 may be supplied by an electric power source 62 under the control of a suitable controller 64 such as an EEC (Electronic Engine Controller) or FADEC (Full Authority Digital Engine Control). The electric power source 62 may, for example, include one or more batteries 62A, an auxiliary power unit (APU) and/or an electric generator from another engine of the same aircraft onto which the engine 10 is mounted. The controller 64 may be configured to control the operation of the electric motor 60 by providing suitable control signals to the electric motor 60 and/or providing suitable conditioning of the electric power supplied to the electric motor 60 by the electric power source 62. The controller 64 may actuate the amount of electric power supplied to the electric motor 60 in response to control signals it receives, such as for example, commands sent via a control interface (e.g., panel) from a pilot of an aircraft to which engine 10 is mounted. The controller 64 and the electric power source 62 may be configured to supply enough electric power to the electric motor 60 in order to produce some or all of the torque required to rotate the propeller 16 during at least one mode of operation of the aircraft.

The electric motor 60 may comprise one or more rotors and one or more respective stators. In some embodiments, the plurality of rotor/stator pairs may be angularly or circumferentially distributed about a shaft axis of rotation. One or more of rotors may have a respective rotor axis of rotation that is radially offset from a center axis of the electric motor 60. In some embodiments, each rotor axis may be radially offset from the center axis at a substantially uniform offset distance. Each rotor may be drivingly engaged (e.g., coupled via a shaft) to a respective drive gear for transferring motive power from the rotors to the propeller 16. The electric motor 60 may be drivingly engaged to transmit and/or receive motive power to/from the propeller 16 in any suitable manner. In some embodiments, the electric motor 60 may be drivingly engaged to the propeller 16 via the drive gears drivingly engaged to a common gear, which is in turn drivingly engaged with the propeller shaft 35 via suitable meshed gearing. The structure and principle of operation of possible configurations for the electric motor 60 are described in U.S. Pat. No. 8,232,700 and in U.S. patent application 2017/0320584 A1, both of which are assigned to Pratt & Whitney Canada Corp., and the entirety of each of which is incorporated by reference herein. The electric motor 60 may be "built-in" into the engine 10, such that the electric motor 60 has all of its components assembled together to provide a single output to the propeller 16. For example, and as shown in FIG. 1, the electric motor 60 and its components may be housed in an annular electric motor housing 61 which is attached to the bearings supporting the propeller shaft 35 at a forward end, and which is attached to an RGB housing 31A at an aft end. The electric motor 60 may therefore be relatively easily inserted and mounted within the engine 10. Accordingly, the electric motor 60 and its physical integration within the engine 10 may, in some embodiments, allow for modifying an existing reverse-flow, multiple-spool engine 10 to be provided with the electric motor 60.

In FIG. 1, the electric motor 60 is coaxial with the spools 20 and with the center axis 17. In an alternate embodiment, the electric motor 60 may have components, such as its rotor or internal gears, which rotate about an axis that is transverse to the center axis 17, such that the electric motor 60 is not coaxial with the spools 20 or the center axis 17. The electric motor 60 is mounted at a location within the engine 10 that is spaced a distance measured in a radial direction from the center axis 17, from the drive shaft 24 of the LPT 21, and from the propeller shaft 35. In FIG. 1, a component of the electric motor 60, such as its rotor and the axis about which the rotor rotates, is spaced a distance measured in a radial direction from the center axis 17, from the drive shaft 24 of the LPT 21, and from the propeller shaft 35. The electric motor 60 is therefore radially offset from the propeller 16 or the drive shaft 24.

Figure 2:
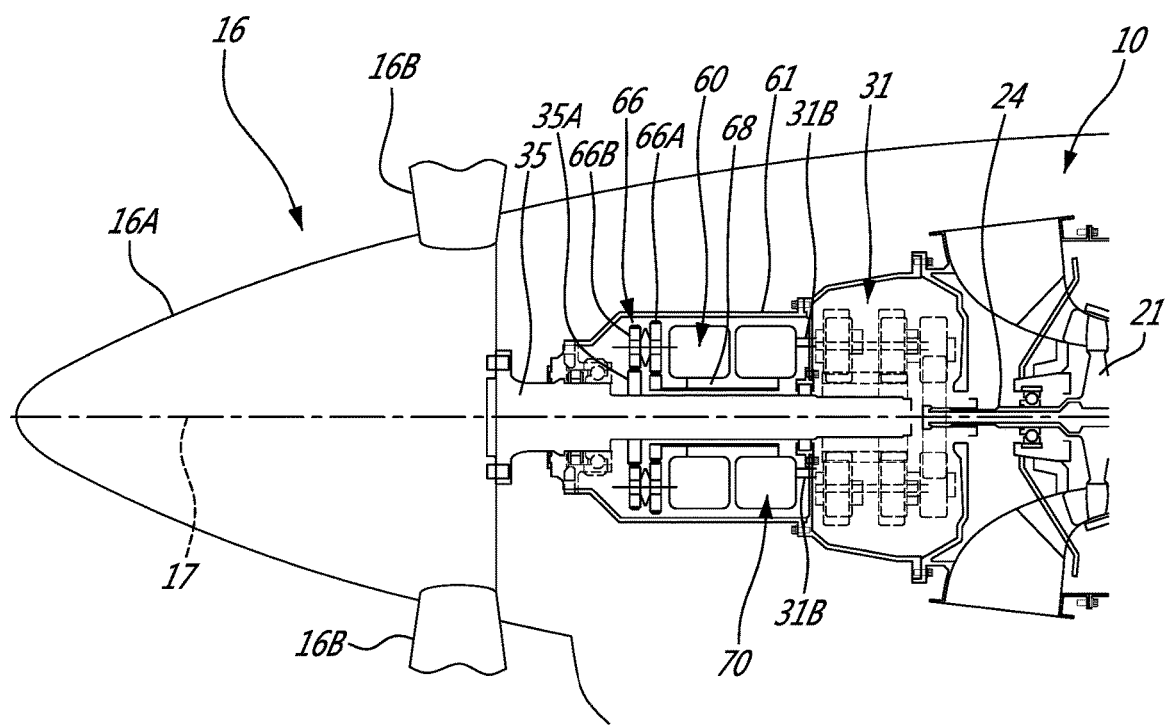
FIG. 2 is a schematic cross-sectional view of part of the gas turbine engine of FIG. 1.

Referring to FIG. 2, the electric motor 60 is indirectly mounted to the propeller shaft 35. The engine 10 includes a gear train 66 drivingly engaged to both the output of the electric motor 60 and the propeller shaft 35, so as to drivingly engage the electric motor 60 to the propeller 16. The electric motor 60 is thus indirectly coupled to the propeller attachment via the gear train 66. The gear train 66 has any suitable arrangement of gearing and ratios to allow an output from the electric motor 60 to be supplied to the propeller 16. In FIG. 2, the electric motor 60 has a motor output shaft 68 which meshes with, and drives, an input gear 66A of the gear train 66. An output gear 66B of the gear train 66 engages and meshes with a radial gear 35A of the propeller shaft 35, to transfer the rotational drive from the motor output shaft 68 to the propeller 16. In FIG. 2, the gear train 66 modifies the speed and torque of the output of the electric motor 60 as desired, to supply the modified output directly to the propeller 16. The gear train 66 is disposed axially between the electric motor 60 and the propeller 16. The gear train 66 is enclosed or housed within the electric motor housing 61. In FIG. 2, the gear rain 66 is a separate component from the electric motor 60, and is separate from the internal gearing of the electric motor 60. In embodiments, one of which is described in greater detail below, the electric motor 60 is coupled directly to the desired component of the propeller 16, and there is no gear train 66 provided between the electric motor 60 and the propeller 16.

In FIG. 2, the gear train 66 is operable to selectively drivingly engage the electric motor 60 to the propeller 16. The gear train 66 allows the electric motor 60 to engage the propeller 16 to transfer a rotational drive thereto, and also allows the electric motor 60 to disengage from the propeller 16 such that the output of the electric motor 60 is not supplied to the propeller 16. This selective engagement may be achieved using any suitable mechanism, such as a clutch. This selective engagement of the electric motor 60 via the gear train 66 may allow for the electric motor 60 to provide the sole rotational drive to the propeller 16, to provide rotational drive concurrently with the drive shaft 24 of the core 18, or to provide no rotational drive to the propeller 16 at all such that the propeller 16 is driven entirely by the output of the core 18. This selective engagement of the electric motor 60 may be used, for example, to allow only the electric motor 60 to provide rotational drive to the propeller 16 during a cruise, taxi, or descent flight condition. This selective engagement of the electric motor 60 may be used, for example, to allow both the electric motor 60 and the core 18 to provide rotational drive to the propeller 16 during a take-off flight condition, such that the electric motor 60 and the output shaft of the core 18 (i.e. the drive shaft 24 of the LPT 21) are operable to concurrently drive the propeller 16. The engine 10 may therefore have a dual connection to propeller 16—one output connection from the electric motor 60 and the second output connection from the core 18 and its LPT 21.

Referring to FIG. 2, the engine 10 has an electric generator 70. During operation, the electric generator 70 converts the mechanical output of the core 18 into electrical power that is supplied to the electric motor 60. The electric generator 70 is configured to provide electrical power to the electric motor 60. In FIG. 2, the electric generator 70 is a separate component from the electric motor 60. One possible configuration of this separateness may include the electric generator 70 and the electric motor 60 being enclosed in separate containers with wiring extending between them to supply electrical power to the electric motor 60. In FIG. 2, the electric generator 70 during operation supplies electrical power only to the electric motor 60. In FIG. 2, the wiring extends only between the electric generator 70 and the electric motor 60 to supply electrical power to the electric motor 60. Additional wiring from the controller 64 to the electric motor 60 and to the electric generator 70 may be routed outside the structure of the engine 10. Referring to FIG. 2, and like the electric motor 60, the electric generator 70 is also disposed axially between the RGB 31 and the propeller 16. In FIG. 2, the electric generator 70 is disposed axially between the RGB 31 and the electric motor 60. In FIG. 2, the electric motor 60 and the electric generator 70 are disposed in series or sequentially between the RGB 31 and the propeller 16. In FIG. 2, the electric generator 70 and the electric motor 60 are axially adjacent, or next to, one another. The engine 10 disclosed herein may therefore be a reverse-flow, multi-spool engine 10 with a cooperating electric motor 60 and electric generator 70 disposed in between the RGB 31 and the propeller 16. In an alternate embodiment of the engine 10, there is no electric generator 70, and the electric motor 60 is supplied with electrical power from another electrical power source 62, such as the batteries 62A. The electric generator 70 may be located elsewhere in the engine 10 in alternate configurations. The electric generator 70 may be connected to the batteries 62A. Referring to FIG. 2, the RGB 31 has an RGB output shaft 31B that transmits the rotational output of the RGB 31. The RGB output shaft 31B, which is itself driven by the drive shaft 24 of the LPT 21, is drivingly engaged with the electric generator 70 to provide the motive power thereto. The "power turbine" shaft 24 in FIG. 2 thus provides some or all of the mechanical input to the electric generator 70, via the RGB 31. In an alternate embodiment, the electric generator 70 is driven by another component, such as the HPT 41, to be used as an electrical power source for the electric motor 60. The controller 64 may provide full digital envelope protection, to optimize "hybrid" operation of the engine 10 through all phases of flight. The controller 64 may be configured to control the operation of the electric motor 60 by optimizing the hybrid engine functionality either via the batteries 62A or directly from the electric generator 70.

Referring to FIG. 1, the starter-generator of, or in, the AGB 50 is a separate component from the electric motor 60 and from the electric generator 70 described above. The starter-generator of the AGB 50 is spaced apart from the electric motor 60 and from the electric generator 70, and is housed in a separate enclosure. The starter-generator of the AGB 50 may be configured as, or include, an electric starter/generator drivingly engaged to a drive shaft of the core 18, to start rotation of the rotatable components of the core 18, such as the compressor section 12. In certain engine operating conditions, the high pressure shaft 43 of the core 18 may provide rotational drive to the starter-generator of the AGB 50 to generate electrical power for various functions unrelated to the operation of the engine 10. This functionality of the starter-generator of the AGB 50 is thus separate from that of the electric motor 60 which is used to provide rotational drive only to the propeller 16. Furthermore, although the electric generator 70 may also be driven by the core 18, the electrical power thus generated by the electric generator 70 is supplied only to the electric motor 60.

Figure 3:
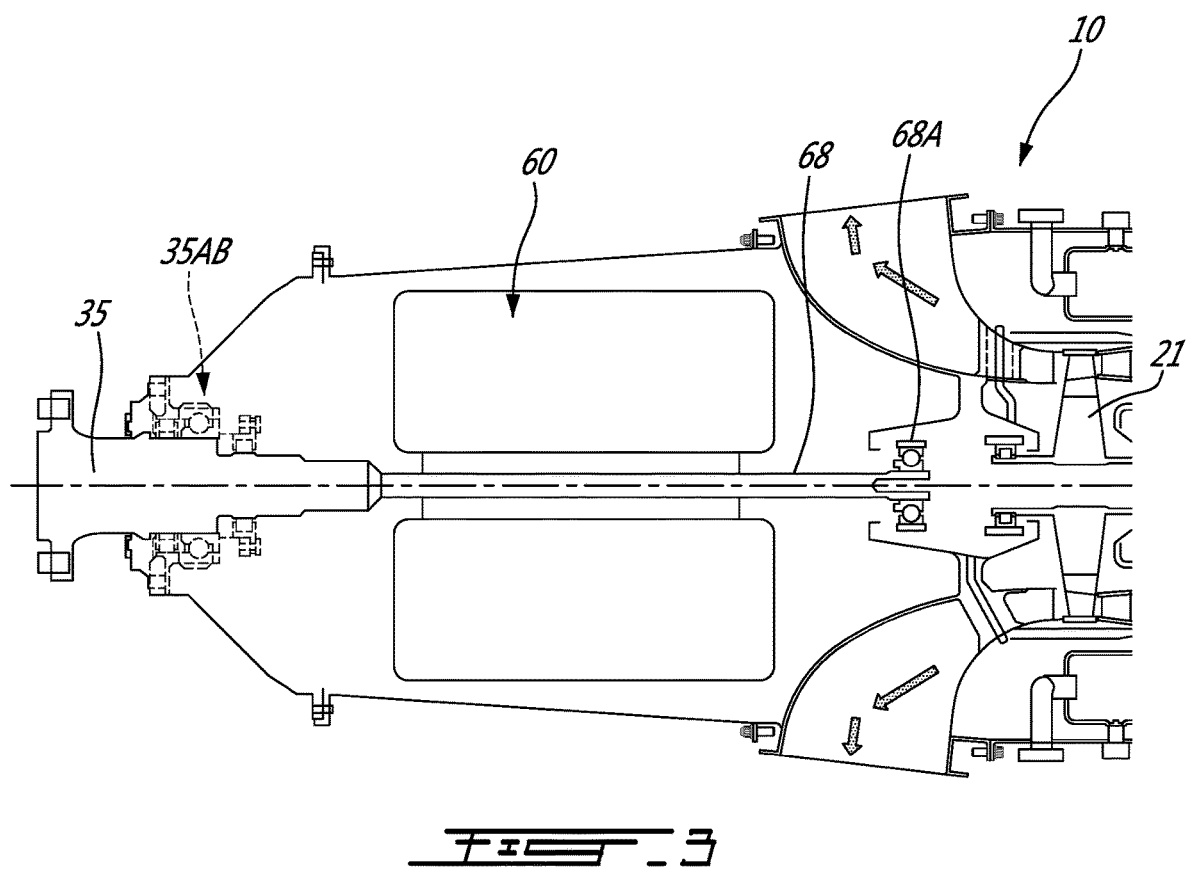
FIG. 3 is another schematic cross-sectional view of an electric motor mounted to a propeller of the gas turbine engine of FIG. 1.

FIG. 3 shows a configuration of the engine 10 where the electric motor 60 is mounted directly to the propeller 16. Features shown in FIG. 3 which are not provided with reference numbers and which are similar to the features shown in other figures bear the same reference numbers as the features shown in other figures. In FIG. 3, the electric motor 60 is coupled directly to the propeller shaft 35 of the propeller 16, and there is no gear train 66 provided between the electric motor 60 and the propeller 16. The electric motor 60 is thus drivingly engaged only to the propeller 16. This direct configuration may take different forms. In FIG. 3, the motor output shaft 68 of the electric motor 60 is drivingly engaged to the propeller shaft 35 to provide the rotational output of the electric motor 60 to the propeller 16. The motor output shaft 68 is supported by bearings 68A at an aft end of the motor output shaft 68, and is supported via the propeller shaft 35 via its bearings 35AB. In FIG. 3, the propeller shaft 35 and the motor output shaft 68 are integral with one another. In FIG. 3, the propeller shaft 35 and the motor output shaft 68 are one integral shaft. This direct configuration of the electric motor 60 and the propeller 16 may allow for the output speed of the electric motor 60 to be selected to exactly match the desired rotational speed of the propeller 16 at a specific flight condition, such as cruise or take-off. In FIG. 3, the engine 10 is a reverse-flow, multi-spool engine with an electric motor 60 having a direct shaft connection with the propeller 16. In FIG. 3, the output of the LPT 21 may not be used to drive the propeller 16, and the engine 10 may not have an RGB 31.

Referring to FIG. 1, there is disclosed a method of modifying or upgrading an existing reverse-flow gas turbine engine 10 having multiple spools 20, an RGB 31, and a propeller 16. The method includes mounting the electric motor 60 within the gas turbine engine 10 and positioning it axially between the RGB 31 and the propeller 16. The method includes drivingly engaging the electric motor 60 to the propeller 16. This may include drivingly engaging the electric motor 60 only to the propeller 16. The method may also include mounting an electric generator 70 axially between the RGB 31 and the propeller 16 to provide electrical power to the electric motor 60. This method may allow for modifying or upgrading an existing engine in the after-market, for example to improve its performance by adding the electric motor 60 in the desired location. This may transform the existing engine into a hybrid electric-fuel gas turbine engine 10.

Referring to FIG. 1, there is disclosed a method of operating the gas turbine engine 10 and the propeller 16. The method includes operating the engine 10 to drive the core 18 and the RGB 31 drivingly coupled thereto. The method includes operating the electric motor 60 positioned axially between the RGB 31 and the propeller 16 to drive, at least partially, the propeller 16.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A reverse-flow gas turbine engine, comprising:
a core having multiple spools rotatable about a center axis of the reverse-flow gas turbine engine, each spool configured to pressurize air and to extract energy from combustion gases, the air and combustion gases configured to flow through the core in a forward direction from an air inlet at an aft end of the core to an outlet at a forward end of the core;
a propeller disposed forward of the outlet, the propeller having a propeller shaft;
a reduction gearbox (RGB) drivingly engaged to the core and to the propeller shaft, the RGB having an RGB housing disposed forward of the core, the propeller shaft extending forwardly from the RGB; and
an electric motor drivingly engaged to the propeller and disposed axially between the RGB and the propeller, the electric motor having an annular electric motor housing extending about the propeller shaft, the annular electric motor housing having an aft end attached to the RGB housing via a radially outward flange of the annular electric motor housing, the annular electric motor housing projecting forwardly from the RGB housing.

2. The reverse-flow gas turbine engine of claim 1, comprising a gear train, the electric motor drivingly engaged to the propeller via the gear train.

3. The reverse-flow gas turbine engine of claim 2, wherein the gear train is disposed axially between the electric motor and the propeller, and wherein the gear train is housed within the annular electric motor housing.

4. The reverse-flow gas turbine engine of claim 2, wherein the gear train is operable to selectively drivingly engage the electric motor to the propeller.

5. The reverse-flow gas turbine engine of claim 1, wherein the core comprises an output shaft drivingly engaged to the propeller shaft via the RGB, the electric motor and the output shaft operable to concurrently drive the propeller.

6. The reverse-flow gas turbine engine of claim 5, wherein the electric motor is mounted at a location within the gas turbine engine radially offset from a location of the output shaft.

7. The reverse-flow gas turbine engine of claim 1, wherein the electric motor is drivingly engaged only to the propeller.

8. The reverse-flow gas turbine engine of claim 1, comprising an electric generator configured to provide electrical power to the electric motor, the electric generator disposed axially between the RGB and the propeller.

9. The reverse-flow gas turbine engine of claim 8, wherein the electric generator and the electric motor are positioned in series axially between the RGB and the propeller.

10. The reverse-flow gas turbine engine of claim 8, wherein the RGB has an RGB output shaft drivingly engaged to the electric generator.

11. The reverse-flow gas turbine engine of claim 1, wherein the electric motor is coaxial with the spools.

12. A reverse-flow gas turbine engine, comprising:
a propeller having a propeller shaft;
a first spool having a low pressure compressor (LPC) in fluid communication with an air inlet and a low pressure turbine (LPT), the LPC disposed axially between the air inlet and the LPT;
a second spool having a high pressure compressor (HPC) in fluid communication with the LPC to receive pressurized air therefrom, and a high pressure turbine (HPT) drivingly engaged to the HPC and in fluid communication with the LPT, the HPC disposed axially between the LPC and the HPT and the HPT disposed axially between the HPC and the LPT;
a reduction gearbox (RGB) drivingly engaged to, and disposed axially between, the LPT and the propeller, the RGB having an RGB housing disposed forward of the core, the propeller shaft extending forwardly from the RGB; and
an electric motor drivingly engaged to the propeller and disposed axially between the RGB and the propeller, the electric motor having an annular electric motor housing extending about the propeller shaft, the annular electric motor housing having an aft end attached to the RGB housing via a radially outward flange of the annular electric motor housing, the annular electric motor housing projecting forwardly from the RGB housing.

13. The reverse-flow gas turbine engine of claim 12, comprising a gear train, the electric motor drivingly engaged to the propeller via the gear train.

14. The reverse-flow gas turbine engine of claim 13, wherein the gear train is disposed axially between the electric motor and the propeller, and wherein the gear train is housed within the annular electric motor housing.

15. The reverse-flow gas turbine engine of claim 13, wherein the gear train is operable to selectively drivingly engage the electric motor to the propeller.

16. The reverse-flow gas turbine engine of claim 12, wherein the first spool comprises an output shaft drivingly engaged to the propeller shaft via the RGB, the electric motor and the output shaft operable to concurrently drive the propeller.

17. The reverse-flow gas turbine engine of claim 12, comprising an electric generator configured to provide electrical power to the electric motor, the electric generator disposed axially between the RGB and the propeller.

18. A method of modifying a reverse-flow gas turbine engine comprising multiple spools drivingly engaged to a reduction gearbox (RGB) and a propeller, the propeller having a propeller shaft and the RGB having an RGB housing, the method comprising:

mounting an electric motor within the reverse-flow gas turbine engine; and positioning the electric motor axially between the RGB and the propeller, and drivingly engaging the electric motor to the propeller, wherein the electric motor is housed within an annular electric motor housing extending about the propeller shaft, the annular electric motor housing having an aft end attached to the RGB housing via a radially outward flange of the annular electric motor housing, the annular electric motor housing projecting forward from the RGB housing.

19. The method of claim 18, wherein drivingly engaging the electric motor to the propeller includes providing a gear train drivingly engaged with the electric motor to selectively drivingly engage the electric motor to the propeller.

20. The method of claim 18, wherein drivingly engaging the electric motor to the propeller includes drivingly engaging an output of the RGB to the propeller, the electric motor and the output operable to concurrently drive the propeller.

* * * * *